3 Sheets—Sheet 1.

H. D. PHILLIPS & C. H. WILLIAMS.
Brick-Machine.

No. 202,861. Patented April 23, 1878.

3 Sheets—Sheet 2.

H. D. PHILLIPS & C. H. WILLIAMS.
Brick-Machine.

No. 202,861. Patented April 23, 1878.

Witnesses,
David G. Weems
W. A. Butram.

Inventors,
Henry D. Phillips.
Carmi H. Williams.
by
R. D. Williams
Attorney.

3 Sheets—Sheet 3.

H. D. PHILLIPS & C. H. WILLIAMS.
Brick-Machine.

No. 202,861.      Patented April 23, 1878.

Witnesses,
David G. Weems
W. A. Bertram.

Inventors,
Henry D. Phillips
Carmi H. Williams
by R. W. Williams
Attorney.

UNITED STATES PATENT OFFICE.

HENRY D. PHILLIPS, OF BALTIMORE, MARYLAND, AND CARMI H. WILLIAMS, OF BROOKLYN, NEW YORK.

IMPROVEMENT IN BRICK-MACHINES.

Specification forming part of Letters Patent No. 202,861, dated April 23, 1878; application filed April 10, 1878.

*To all whom it may concern:*

Be it known that we, HENRY D. PHILLIPS, of the city of Baltimore, State of Maryland, and CARMI H. WILLIAMS, of the city of Brooklyn, county of Kings, and State of New York, have invented certain new and useful Improvements in Brick-Machines; and we hereby declare the same to be fully, clearly, and exactly described as follows, reference being had to the accompanying drawings, in which—

Figure 1:
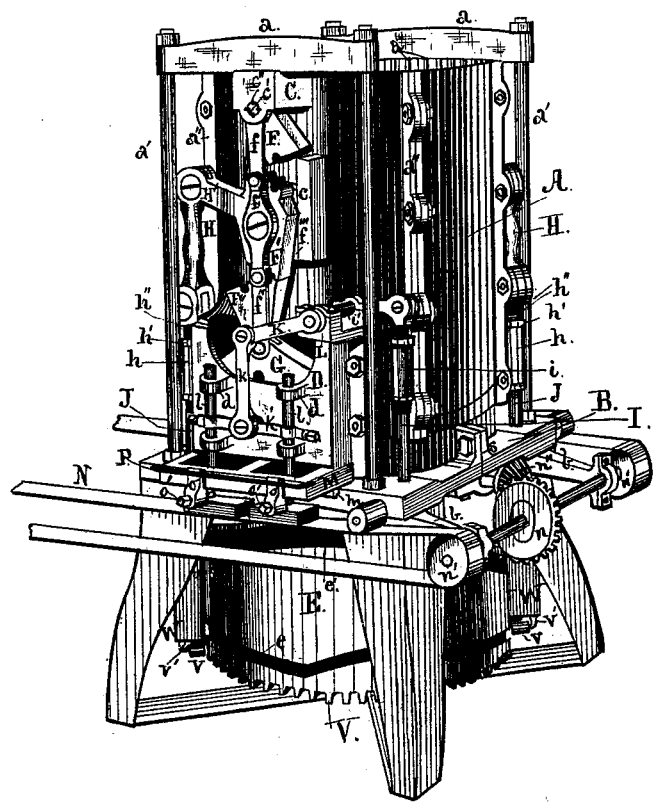
Figure 2:
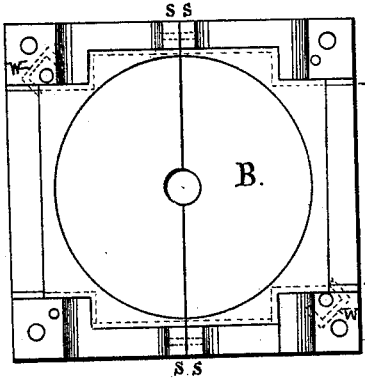
Figure 3:
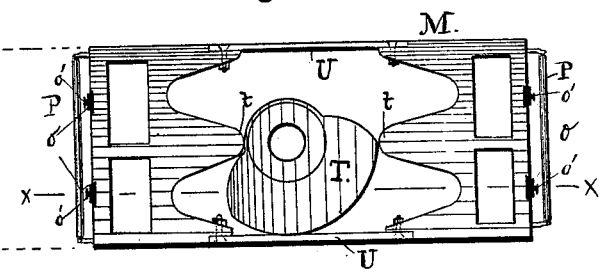
Figure 4:
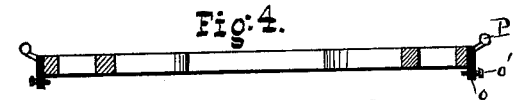
Figure 5:
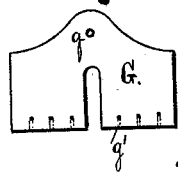
Figure 6:
Figure 7:
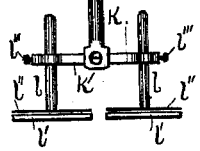
Figure 8:
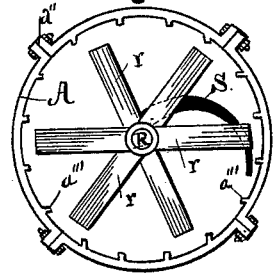
Figure 9:
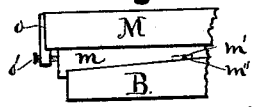
Figure 10:
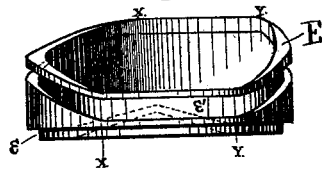
Figure 11:
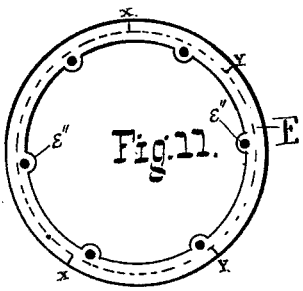
Figure 12:

Figure 1 represents the said machine in perspective. Fig. 2 is a plan view of the bed-plate; Figs. 3 and 4, respectively, plan and sectional views of the brick-molds; Figs. 5 and 6, similar views of the plunger; Fig. 7, a side elevation of the mechanism for releasing the bricks from the molds. Fig. 8 is a plan view of the pug-mill; Fig. 9, a side elevation of a portion of the bed-plate and brick-mold. Fig. 10 is a similar view of the driving-cylinder; Fig. 11, a plan view of the same; Fig. 12, a side elevation of the driving-gear, and Figs. 13 and 14 side elevations of the mechanism for actuating the plunger.

This invention relates to that class of brick-machines in which the clay is continuously tempered and formed into bricks ready for drying and burning; and it consists in certain details of construction and combinations of parts not here necessary to enumerate and set forth, as they are made the subjects of claims based upon the following description.

In the accompanying drawings, A represents the pug-mill, preferably cast in sections, and bolted together through radial flanges $a''$. Internally the cylindrical sections are provided with longitudinal ribs $a'''$, for the purpose of holding the clay and preventing its being carried bodily round in the mill during the process of tempering.

The mill is furnished with a boss, C, at either side, upon which rests a beam, $a$, which is secured to the bed-plate B by means of rods $a'$. Guides $c$, for a purpose which will shortly be apparent, are cast or secured upon the mill at either side. Boxes D, within which the plungers G reciprocate, are cast with flanges, through which bolts pass, securing the boxes to the mill, as shown.

A central vertical shaft, R, (see Fig. 8,) has its bearings, respectively, in the base-piece of the machine and in a cross-beam over the pug-mill. To the shaft R is securely keyed, below the mill, a cylinder, E, provided with cam-grooves $e\ e'$, and bevel-gear V. The construction of the cylinder E is shown in detail in Figs. 10, 11, and 12.

Upon the shaft R, within the mill, are secured the blades $r\ r$, for tempering the clay, and the curved sweep S, for forcing it into the clay-boxes D.

A cam, T, Fig. 3, is keyed to the shaft R below the bottom plate of the mill, and serves to actuate the brick-molds M, which reciprocate between the bottoms of the clay-boxes and the base B.

The main plate of the machine is perforated at each corner, as shown in Fig. 2, and through the perforations, in two diagonal corners, pass the rods or shafts for driving the brick-making machinery proper. The shafts referred to are arranged to reciprocate within bearings W, secured to the main frame of the machine, and are provided with roller-lugs, which travel within the cam-races $e\ e'$.

It may here be remarked that the mechanism upon the side of the machine not shown in Fig. 1 is similar in every respect to that illustrated.

The roller-lugs upon the rods J J travel in the upper cam-race $e'$; those upon the rods I I in the lower race $e$. The rods J are threaded at their upper ends, and are connected with rods $h''\ h''$, oppositely threaded, by means of sleeves $h\ h$, the threaded portions of the rods being provided with jam-nuts $h'$, as shown.

To the rods $h''$ are pivoted arms H H, which in turn are pivoted to arms H', formed integral with, or securely attached to, a cogged cam, F'. This cam constitutes the pivotal point of the brick-making mechanism, which is shown enlarged and in detail in Figs. 13 and 14. Within the boss C upon the mill is pivoted, upon an eccentric-pin, $c'$, the cogged cam F, which engages with the cam F', and that in turn with a cam, F''. All of the cams are connected by rods $f\ f'\ f''$, pivoted together, as shown, the lower cam F'' being attached to the plunger G. To the central cam F' is secured a block, $f'''$, which slides in the guides $c$ upon the mill as the cam is rocked. The plunger G reciprocates within the box D, upon which are cast bosses $d\ d$, through which the rods $l\ l$ are arranged to slide. The rods $l$ are connected by a rod, $k'$, to which is secured an arm, $k$, that is pivoted to another arm, K. The latter is keyed to a rock-shaft journaled in a box, L, and is actuated by means of a rod, I, having sleeve $i$ and jam-nuts, as shown. The rod I reciprocates through the bed-plate, being provided with a roller-lug, which travels in the lower cam-groove $e$.

Such is a description in general terms of the construction of the machine. The various parts will now be taken up and fully described in detail, reference being had to the figures of the drawings in which they are illustrated.

The pug-mill is provided near the bottom, at either side, with ports or openings leading into the clay-box D, through which openings the proper charge of clay is forced by means of the curved sweep S. The blades $r\ r$ are slightly inclined, and operate to thoroughly mix and temper the clay, and at the same time force it toward the bottom of the mill, and within reach of the sweep. The brick-mold (see Figs. 3 and 4) consists of a pair of castings, M, connected by rods U, each casting being provided with one or more apertures of the shape of a brick. The mold is driven back and forth beneath the clay-boxes D by means of the cam T, which bears upon the points $t\ t$, preferably provided with rollers to diminish friction and wear. At either end of the mold is a roller, P, covered with felt and kept saturated with oil, which passes over the faces of the plates $l'\ l'$, that release the bricks from the molds. The object of this construction is to prevent any adherence of the bricks to the plates. The plunger G, Figs. 5 and 6, fits closely within the box D, and is slotted in order to enable it to enter the apertures in the brick-mold. A series of small perforations, $g'\ g'$, are formed from the face of the plunger to one of its sides, the function of which will be hereinafter referred to. The cam T, which actuates the brick-mold, is of such size and shape as to bring the apertures in the mold exactly under the plunger at each stroke, and also exactly under the plates $l'$, which release the bricks from the molds.

The plate which covers the bottoms of the apertures in the mold, and between which and the plunger the clay is compressed, is shown in Fig. 9. It is obviously essential that this plate shall be in close contact with the lower surface of the mold as the clay is being compressed, and desirable that it be slightly withdrawn afterward to admit of the mold being readily moved. To this end the face of the bed-plate B is somewhat inclined under the boxes D, and a plate, $m$, similarly formed or wedge-shaped, is laid thereon, and constitutes the bottom plate of the mold. The latter is provided with set-screws $o'$, passing through lugs $o$, which drive the wedge $m$ home and into close contact with the mold as the same is drawn under the box D.

A pin, $m''$, secured in the base B, and entering a slot, $m'$, in the wedge $m$, prevents its entire withdrawal upon the return stroke of the mold, while admitting of its being moved sufficiently to allow the mold to move freely.

The plates $l'$, for removing the bricks from the molds, are of such size as to fit snugly within the apertures in the mold, and are attached to rods $l$, which are vertically adjustable upon the bar $k'$, being secured at any desired height by means of screws $l'''$.

Each plate is provided with a felt cover, $l''$, which is kept saturated with oil, and lubricates the walls of the apertures in the mold at each stroke.

The main driving-cylinder, Figs. 10, 11, and 12, consists of a hollow casting, E, upon which is formed the cam-groove $e'$ for the lugs of the brick-presses, the extent of the rise and fall of the cam-groove being indicated by the letters $x\ x\ y\ y$.

Lugs $e''$, perforated for the insertion of bolts, are cast upon the cylinder E, the bevel-gear V being thereby secured to the cylinder. As far as the lower race $e$ is horizontal it is formed by the edge plate of the gear-wheel, and a shoulder upon the lower end of the cylinder, the remainder being cut, as shown in dotted lines.

To the bearings W W are secured rollers $v\ v$, which sustain the annular plate $v'$ upon the gear-wheel, and prevent lateral strain upon the main shaft.

The bed-plate B is preferably formed in two parts, (see Fig. 2,) bolted together through the lugs $s\ s$.

Figure 13:
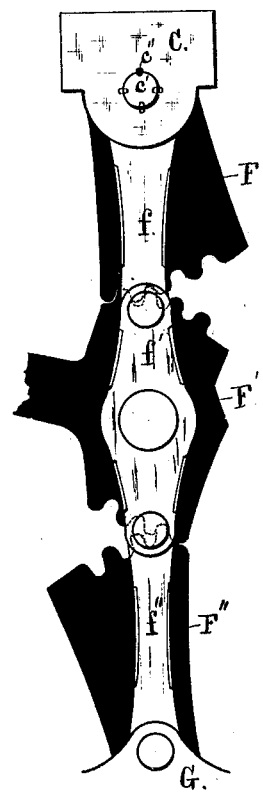
Figure 14:
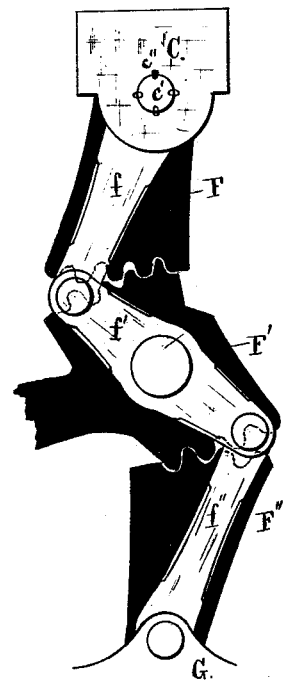

The construction of the cams for driving the plunger is shown in Figs. 13 and 14, and need not be further dwelt upon, except to state that the eccentric-pin $c'$ of the cam F is adapted to be rotated to take up wear and tear of the parts, and is secured by means of a pin, $c''$, as shown.

The adjustments of the parts may be described as follows: The cylinder E is keyed to the shaft in such position that the roller-lugs of the plunger-rods and the rods actuating the releasing-plates $l'$ do not operate their respective connections within the molds pending the motion of the latter, the sweep S being so adjusted as to drive the clay into the boxes D, while the plungers are stationary at the top of their strokes, the plates $l'$ releasing the bricks, while the molds are stationary.

The throw of the rods which actuate the plunger-cams may be readily adjusted by means of the threaded collars $h\ h$, and is such as at each stroke to carry the cams slightly past the centers, thereby securing a very important advantage, which will be hereinafter fully set forth. The return stroke of the cams in bringing them into line produces a slight downward motion of the plunger, which takes place after a sufficient movement of the mold to admit it, the wedge $m$ being withdrawn with the mold.

The plungers are arranged to slightly enter the molds at the end of their downward stroke, and be carried up, as the cams pass the centers, just flush with the upper surface of the molds. The clay is thereby compressed to a point within the molds, and rises by its elasticity as the plunger is withdrawn; but the tendency to overflow the mold, as it were, is destroyed. The clay rises but about flush with the edge of the mold, where it again meets the plunger for an instant before the mold is withdrawn. The result of this arrangement is to produce a brick with a smooth upper surface, avoiding that appearance of having been scraped or cut off which has heretofore been characteristic of machine-made bricks. The eccentric-pin $c'$ and sleeve $h$ furnish means for readily adjusting the stroke of the plunger, as may be desired.

The operation of the device is as follows: Power being applied in any appropriate manner, the cylinder E is caused to revolve. The blades $r\ r$, as hereinbefore stated, thoroughly mix and temper the clay, and carry it gradually toward the bottom of the mill, where the curved sweep S carries a charge of it alternately into the boxes D as the plungers G rise. As the plungers descend, the clay is pressed with great force into the molds, the excess of clay being forced through the holes $g'$ in the plunger into the opening of the mill. As the plunger rises the molds are carried out from under the box, and the bricks, being released by the plates $l'$, fall upon the belt N, which is driven by appropriate gearing, as shown in Fig. 1. As the plates $l'$ rise the interior of the molds is lubricated and wiped by the felts $l''$, the plate $l'$ being also lubricated by the roller P as the mold is again drawn under the box.

By the mechanism described and shown for driving the plungers especial advantages are secured. It will be evident that there is little or no lateral thrust upon the bearings of the cogged cams, wear and tear is reduced to a minimum, widely and evenly distributed, and readily taken up when it does occur.

The mutual adaptation of the eccentric-pin $c'$ and sleeve $h$ permits the greatest nicety of adjustment in regulating the thrust of the plunger—a point of paramount importance in machines of this class, as the slightest wear of parts results in uneven and unsatisfactory work.

The straps or arms $f\ f'\ f''$ subserve only the function of lifting the plunger, and are wholly inactive during its downward stroke, which is effected by means of the cams F F' F''.

Having thus described our invention, what we claim, and desire to secure by Letters Patent, is—

1. In a brick-machine, a plunger adapted at each stroke to compress the clay to a point within the mold, and be then withdrawn flush with the surface of the same, as set forth.

2. In a brick-machine, a movable mold adapted to automatically force a cover-plate into close contact with one of its sides as the bricks are formed, the said plate being subsequently released, substantially as described.

3. In a brick-machine, a reciprocating plunger actuated by a series of cogged cams connected by straps, substantially as described.

4. In a brick-machine, a reciprocating plunger actuated by means of a series of cogged cams, in combination with mechanism for adjusting the throw of the same, as set forth.

5. In a brick-machine, a reciprocating mold having a lubricating-roller, which at each stroke of the mold traverses the face of the releasing-plate, substantially as described.

6. In a brick-machine, a releasing-plate having on its upper surface a felt or fibrous cover saturated with oil, the same being adapted to wipe and lubricate the interior of the molds, substantially as described.

7. In combination with the cogged cams and plunger, the eccentric-pin $c'$, as described.

8. In combination with the plunger and cogged cams, the arms H H' J and intermediate sleeve $h$, substantially as described.

9. In combination with the mold M, the wedge $m$ and set-screws $o'$, as set forth.

10. In combination with the mold M, having roller P, the plates $l'$, having felts $l''$, substantially as described.

11. In combination with the cylinder E, having cam-races, as described, the rods I J, actuating, respectively, the plunger and releasing-plates by intermediate connections, substantially as described.

12. In combination with the cylinder E, the gear-wheel V, having flange $v'$ and the rollers $v$, substantially as described.

13. In combination with the plunger G and cogged cams F F' F'', the mold M and cam T, substantially as described.

14. In combination with the plunger G and cams F F' F'', the straps $f\ f'\ f''$, block $f'''$, and guides $c$, substantially as described.

HENRY D. PHILLIPS.
CARMI H. WILLIAMS.

Witnesses:
DAVID G. WEEMS,
W. A. BERTRAM.